US005758546A

United States Patent [19]

Taomo et al.

[11] Patent Number: 5,758,546

[45] Date of Patent: Jun. 2, 1998

[54] HAND LEVER DEVICE

[75] Inventors: Toshio Taomo, Tokyo; Hisato Ohsawa, Hamura; Hirofumi Yamami, Akishima; Fumihiko Aiyama, Musashimurayama, all of Japan

[73] Assignee: Kioritz Corporation, Tokyo, Japan

[21] Appl. No.: 640,470

[22] Filed: May 1, 1996

[30] Foreign Application Priority Data

May 2, 1995 [JP] Japan .................................... 7-108340

[51] Int. Cl.$^6$ ............................. F16C 1/12; G05G 11/00

[52] U.S. Cl. .......................... 74/501.6; 74/502.2; 74/506; 74/489; 74/488

[58] Field of Search .................................... 74/501.6, 489, 74/427, 426, 512, 471 R; 200/61.86; 30/382

[56] References Cited

U.S. PATENT DOCUMENTS

| | | | |
|---|---|---|---|
| 3,683,716 | 8/1972 | Anderson | 74/489 |
| 3,688,599 | 9/1972 | St. Germain | 74/526 |
| 4,016,838 | 4/1977 | Yoshioka et al. | 74/471 R |
| 4,028,804 | 6/1977 | Hammond | 30/382 |
| 4,186,291 | 1/1980 | Swanson | 200/61.86 |
| 4,237,997 | 12/1980 | Swanson | 123/335 |
| 4,240,308 | 12/1980 | Berggren | 74/512 |
| 4,302,880 | 12/1981 | Elfving et al. | 30/382 |
| 4,528,954 | 7/1985 | Slattery | 123/413 |
| 4,570,593 | 2/1986 | Take et al. | |
| 5,067,365 | 11/1991 | Lauer | 74/501.5 R |
| 5,239,891 | 8/1993 | Stocker | 74/513 |
| 5,365,802 | 11/1994 | Suzuki et al. | 74/842 |

FOREIGN PATENT DOCUMENTS 57-47405 10/1982 Japan .

*Primary Examiner*—Vinh T. Luong
*Attorney, Agent, or Firm*—Cushman Darby & Cushman IP Group of Pillsbury Madison & Sutro, LLP

[57] ABSTRACT

A hand lever device is adapted so that a throttle valve as a driven member can be adjusted appropriately in its degree of opening via a cable and kept at a desired degree of opening and yet immediately returned to the minimum degree of opening. The throttle valve can be brought to the degree of opening at which it had stood before it was returned to the minimum opening degree without the necessity of readjustment. The hand lever device comprises a main lever (30) and a sub-lever (60) which ice pivotally operated, wherein the sub-lever (60) is adapted to draw a cable (20) connected to a driven member (CV) via a pulley (50), and wherein the pulley (50) is moved by the main lever (30).

6 Claims, 5 Drawing Sheets

HAND LEVER DEVICE

BACKGROUND OF THE INVENTION

1. Field of the Invention

The present invention relates to a hand lever device for operating a driven member, such as a throttle valve, of an internal combustion engine via a cable. In particular, it relates to one which is preferably mounted on a working machine such as a hedge trimmer or brush cutter in the vicinity of a grip of a handle thereof to operate such a throttle valve or the like via a throttle cable or the like.

2. Description of the Prior Art

For example, in a working machine such as a hedge trimmer and brush cutter, an operative portion including a cutting blade and the like is driven generally by an internal combustion engine, a lever device for controlling the degree of opening of a throttle valve of the internal combustion engine is mounted in the vicinity of a grip of a U-shaped handle, bar handle or the like of the working machine so as to control the output force of the internal combustion engine by hand.

The lever device is generally provided with a throttle trigger (throttle lever) operated by operator's fingers and adapted so that the throttle lever is pivotally operated to thereby control the degree of opening of the throttle valve via a throttle cable. In general, the throttle valve is always biased toward the direction of minimum the degree of opening (for idle rotation). Accordingly, it is normally kept at the opening degree for idle rotation, and when the throttle cable is drawn in a predetermined amount to eliminate play, it begins to open from the minimum degree of opening for idle rotation to an degree of opening for high speed rotation.

Known lever devices for controlling the degree of opening of a throttle valve, include an auto-return type which is adapted so that when a throttle lever is released from pivotally operated position, the lever is automatically caused to return to original position (degree of opening for idle rotation) together with a throttle valve, and an immobilizable type adapted so that if fingers are released from a throttle lever, the throttle lever can always be held immobilized at a desired pivotally operated position (see Japanese Examined Utility Model Publication No. 19944/1989, etc.)

In the auto-return type, when fingers are released from a throttle lever, an engine is automatically caused to return to idling. Consequently, if the auto-return type is used in a working machine and adapted so that output force of the engine is transmitted to an operative portion including a cutting blade via a centrifugal clutch, the centrifugal clutch is disconnected to cut off the transmission of the driving force to the operative portion. Accordingly, the operation of the operative portion can immediately be stopped by returning the throttle valve to the degree of opening for idle rotation when an accident is caused, thereby advantageously attaining improved safety. On the other hand, the throttle valve must be held continuously by fingers at a desired pivoted operated position. This causes problems in that this type is awkward with respect to intermediate degrees of opening, the operator's fingers are susceptible to fatigue, and the operated amount (rotational speed) is likely to be unstable.

In contrast thereto, the immobilizable type is capable of solving the above problems in the auto-return. That is, it is capable of providing advantages because a throttle lever can always be held immobilized at a desired pivotal operation position without the operator having to hold it with his/her fingers. Moreover, operation is performed with ease because fingers are liberated from holding it. However, since additional operation is required to liberate the throttle lever from the immobilized position, it is impossible to immediately stop an operative portion even if an accident is caused. Accordingly, there is a problem that, in terms of safety, the immobilizable type is inferior to the auto-return type.

Further, in either type, once the throttle lever has been released to suspend its operation, if the level is to be returned to the previous opening degree to resume the operation (often occurs for a working machine such as a brush cutter), the pivotally operated position of the throttle lever must be readjusted. There is still room for improvement in operability in view of such cumbersome operation.

SUMMARY OF THE INVENTION

The present invention has been made in view of these problems. It is, therefore, an object of the present invention to provide a hand lever device which is adapted so that a throttle valve as a driven member can be adjusted appropriately in its degree of opening via a cable and kept at a degree of opening and yet immediately returned to the minimum degree of opening to ensure high safety. It is another object of this invention that fatigue of the operator's fingers can be diminished, and that the throttle valve is advantageously enabled to be brought to the degree of opening at which it had stood before it was returned to the minimum degree of opening without the necessity of readjustment.

To attain the above-mentioned object, the hand lever device according to the present invention, as a basic embodiment, comprises:

a main lever and a sub-lever which are being pivotally operated;

wherein the sub-lever is adapted to draw a cable connected to a driven member via a cable turnaround member, and the cable turnaround member is moved by the main lever.

The preferred embodiments of the present invention include one wherein the cable turnaround member is rotatably held by a slider of a toggle mechanism and wherein the main lever is used as a constituent link of the toggle mechanism. Another preferred embodiment is one wherein the cable turnaround member is a pulley, and another wherein the driven member is a throttle valve of an internal combustion engine.

Further, it is preferred in the present invention that the sub-lever be adapted to be immobilized at a desired position.

In the case where the driven member is a throttle valve of an internal combustion engine, a more preferred form has the following constitution.

A hand lever device comprises a main lever and a sub-lever, the hand lever device being disposed in the vicinity of a grip of a handle of a working machine. The working machine comprises an operative portion including a cutting blade driven by an internal combustion engine provided with a throttle valve. The throttle valve is always biased in the direction of a degree of opening for idle rotation and thereby adapted so that when a throttle cable connected thereto is drawn from a non-operating position by a predetermined amount or more, play is eliminated and the throttle valve begins to open from the degree of opening for idle rotation.

The throttle cable is drawn by the sub-lever via a cable turnaround member. The cable turnaround member is moved by the main lever from the first position where the throttle cable is unoperated to the second position where the play is eliminated.

In the preferred form of the hand lever device according to the present invention described above, when the main lever is operated to pivot to the set position close to the grip, the pulley, by way of which the throttle cable, is moved by the action of the toggle mechanism. The toggle mechanism uses the main lever as a constituent link from the first position where the throttle cable is unoperated to the second position where the play is eliminated.

The throttle cable is thereby drawn by a predetermined amount to eliminate the play. Then, the sub-lever is operated to pivot to a desired position while holding the main lever at the set position. The throttle cable is thereby further drawn via the pulley to rotate the throttle valve from the minimum degree of opening (for idle rotation) in the opening direction, thus adjusting degree of opening of the throttle valve. Consequently, the internal combustion engine is actuated at a desired rotational speed.

In this condition, even if operator's hold on the sub-lever is released, the sub-lever is kept immobilized still at the operational position by the frictional force with, for example, the cover case of the hand lever device. Accordingly, the throttle valve is kept at the adjusted opening degree (set opening degree), thereby relieving fatigue of the operator's fingers.

In the event that it is necessary, due to occurrence of an accident or the like, to immediately lower the rotational speed of the engine, the main lever is released. Because the throttle cable is biased toward the throttle valve narrowing direction, the pulley is thereby caused to return from the second position to the first position. The throttle cable is in turn returned to the non-operating position to return the throttle valve to the degree of opening for idle rotation. Consequently, the engine is brought into idling. Accordingly, if a working machine is adapted so that rotational driving force of an engine is transmitted to an operative portion including a cutting blade and the like via a centrifugal clutch, the centrifugal clutch is disconnected to cut off the transmission of the driving force to the operative portion. This enables the operative portion, including the cutting blade, to be immediately stopped.

When the main lever is again operated to pivotally move to the set position close to the grip after having been once released, the play of the throttle cable is eliminated with the sub-lever still immobilized at the operational position previously set. Consequently, the throttle valve is returned to the degree of opening at which it had stood before the main lever was released, without necessity of readjusting the sub-lever.

Further, when the main lever is used as a constituent link of the toggle mechanism and is brought to a position closer to the set position, lesser force is required to hold it. Accordingly, even if the grip is held for a long period of time with the main lever at the set position, the operator's fingers do not become as tired.

DESCRIPTION OF THE PREFERRED EMBODIMENTS

Now, the present invention will be described in more detail with reference to the accompanying drawings.

Figure 1:
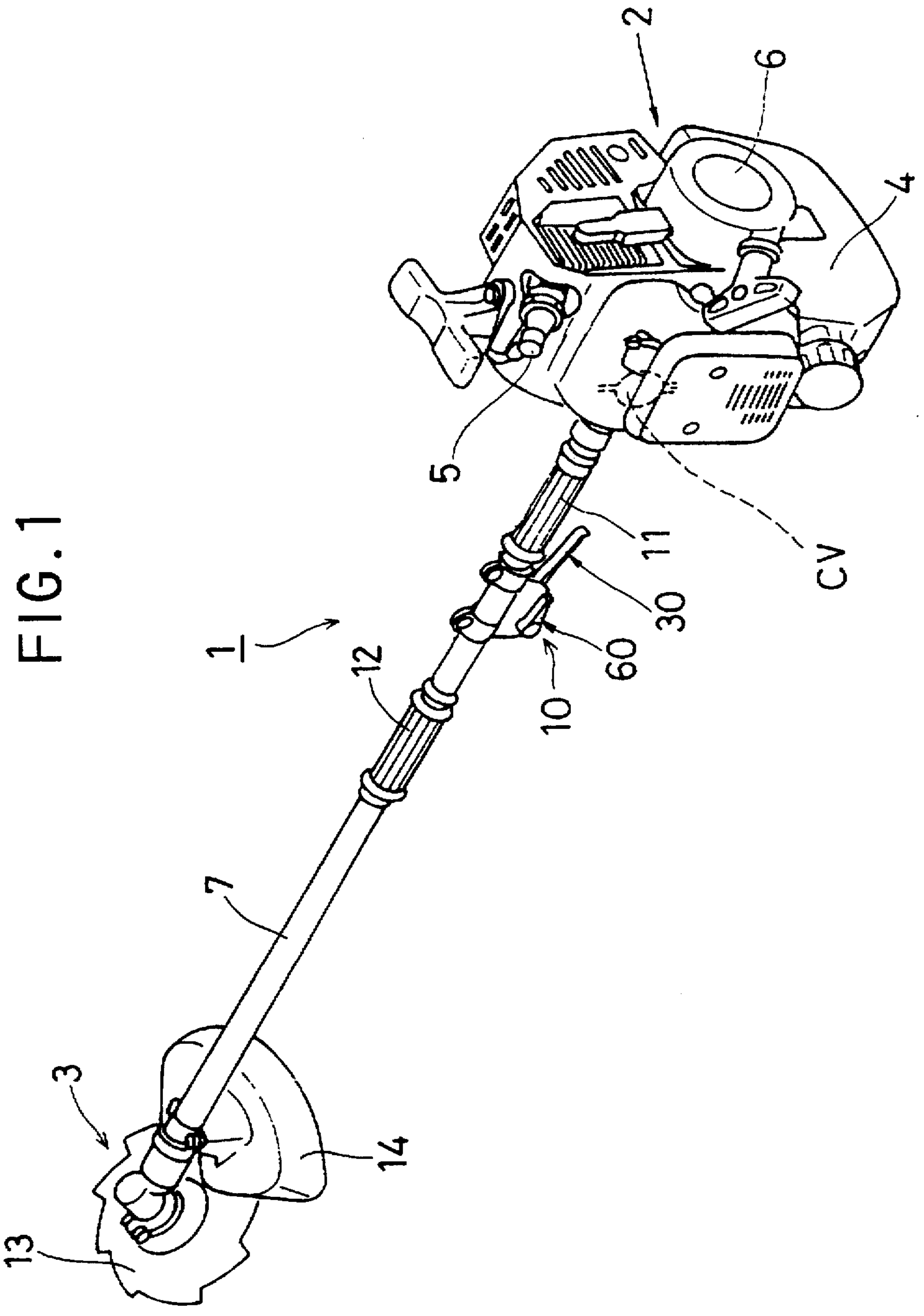
FIG. 1 is a perspective view showing an example of a brush cutter adopting an embodiment of the hand lever device according to the present invention.

FIG. 1 shows an example of a brush cutter employing one embodiment of the hand lever device according to the present invention. The illustrated brush cutter 1 comprises a bar handle (operating rod) 7 provided with grips 11, 12 spaced a predetermined distance apart. An operative portion 3 is provided on the distal end of the bar handle 7 and includes a cutting blade 13, a safety cover 14 and the like, and an internal combustion engine(for example, a small air-cooled two-cycle gasoline engine) 2 which is disposed on the proximal end of the bar handle 7 and which serves as a driving power source for driving the cutting blade 13 via a drive shaft 8 inserted through the bar handle 7. The internal combustion engine 2 is provided with a carburetor having a throttle valve CV and a spark plug 5. The internal combustion engine 2 also is provided with a fuel tank 4 and a recoil starter 6.

In this example, the throttle valve CV is always biased in the direction of a minimum degree of opening (for idle rotation) and thereby adapted so that when a throttle cable 20 (see FIG. 3) connected thereto, which will be described below, is drawn from a non-operating position by a predetermined amount or more, play is eliminated and consequently the throttle valve CV begins to open from the minimum degree of opening.

In the vicinity of the front end of the grip 11, which is the one of the grips 11 and 12 that is gripped generally by operator's right hand, the one embodiment of the hand lever device 10 according to the present invention is provided to adjust the degree of opening of the throttle valve CV.

As shown in FIGS. 2 to 5, the hand lever device 10 comprises a main lever 30 which is relatively long and composed of front and rear sections 31, 32 joined together by means of screws 33, 33, a sub-lever 60 which is relatively short, and a cover case composed of right and left plate-like cover case members 15A, 15B (hereinafter often referred to simply as cover case 15A, 15B) for pivotally holding the levers. Of these cover case members, the right cover case member 15B is integrally formed with ring-like fastening portions 16. The fastening portions 16 are fixedly mounted on the bar handle 7 inserted therethrough by clamping each of their slotted portions (not shown) with a bolt assortment (which means a combination of a bolt or screw, a nut, a washer and the like, and the same applies hereinbelow) 17 and is tightly connected to the left cover case member 15A with a predetermined distance therebetween by means of bolts 26, 27, 28 and 29 to pivotally hold the main lever 30 therebetween.

One end of the throttle cable 20 is led into the cover case composed of the right and left cover case members 15A and **15*b*. The throttle cable 20 is connected to the throttle valve CV of the internal combustion engine 2 at the other end and inserted through an outer tube 21 of a Bowden cable. The distal end 21*a* of the outer tube 21 is fastened by a fastening means 23 provided in the cover case 15A, 15B. The one end of the throttle cable 20 is led by way of a pulley 50 as a cable turnaround member which will be described below to turn around the cable. The cable 20 is locked with a terminal metal piece 22 which is fitted into a locking notch 66*a* of a traction member 66 which is adapted to pivotally move along with the sub-lever 60** and will be described below.

Figure 3:
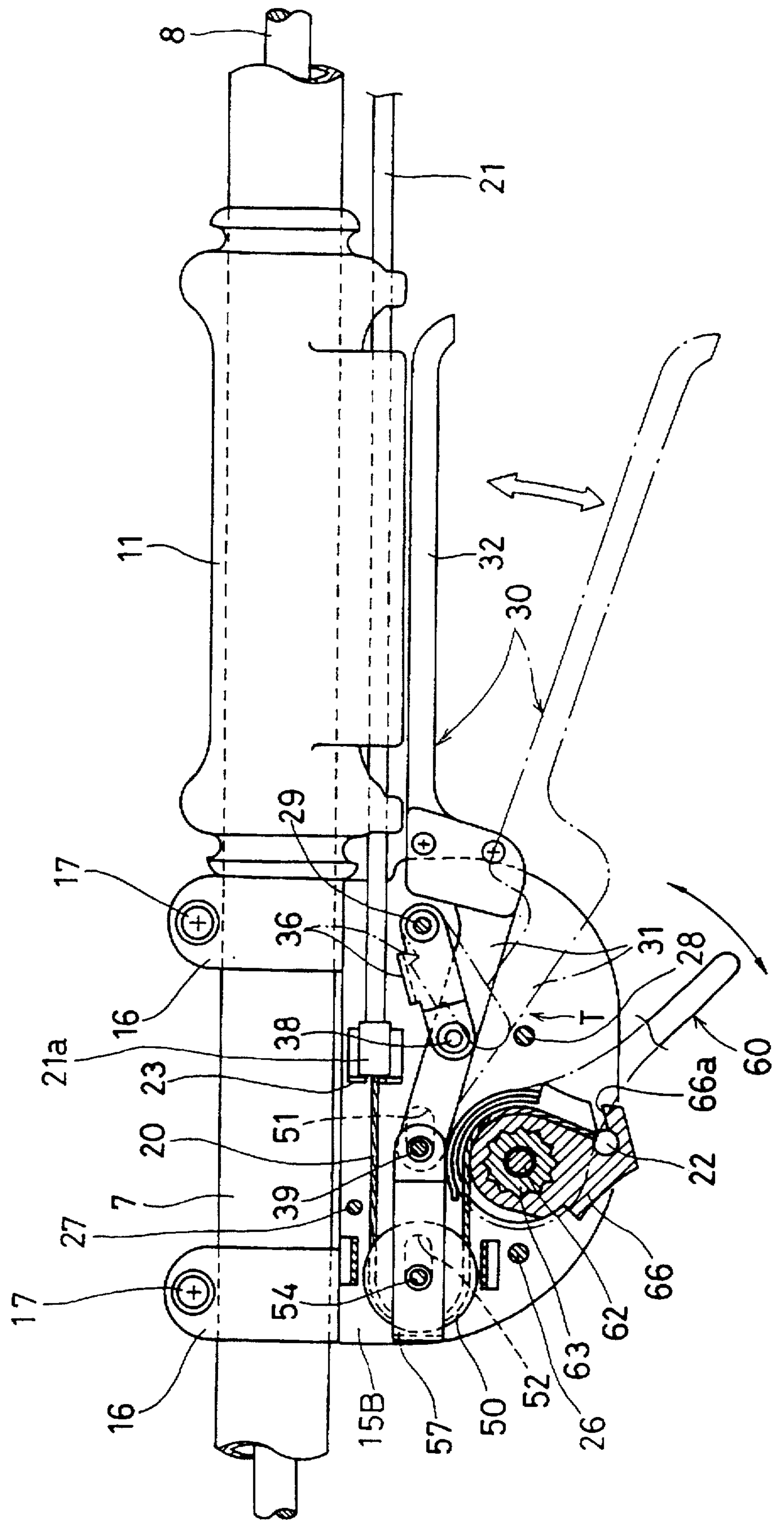
FIG. 3 is an illustrative view with a left cover case 15A shown as being removed for illustrating operation of the hand lever device shown in FIG. 2.
Figure 4:
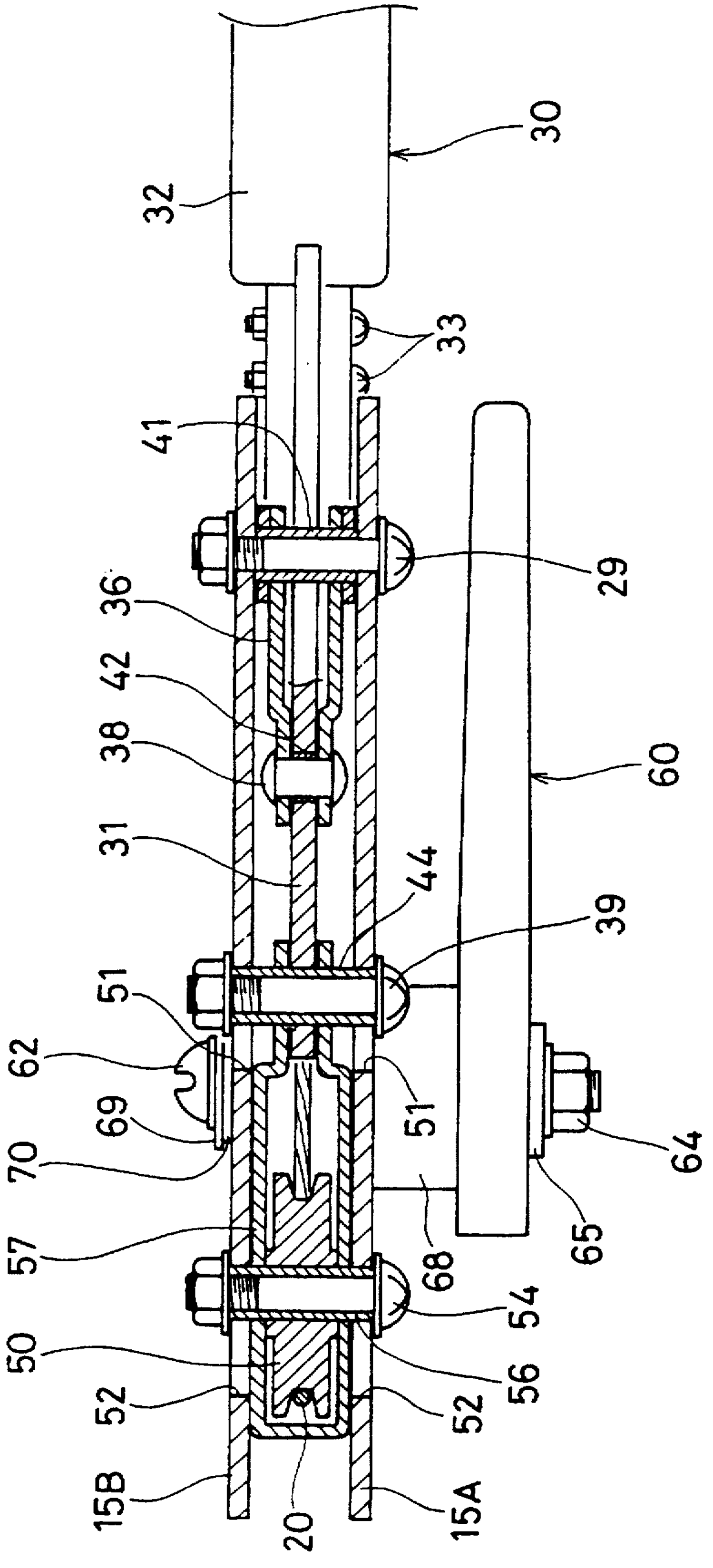
FIG. 4 is an enlarged sectional view taken along the line IV—IV and viewed in the direction of the arrows in FIG. 2.

As will be seen with reference to FIGS. 3 and 4, the pulley 50 forms a cable turnaround member through which the throttle cable 20 is led. The throttle cable 20 is rotatably located in a slider 57 which has a channel-like shape and which is included as a constituent in a toggle mechanism T which includes the main lever 30 as a constituent link, thereby moving along with the slider 57. In other words, a bolt assortment 54 with a collar 56 externally fitted thereon is transversely inserted through the slider 57. The center of the pulley 50, as a spindle, which is slidable in both directions and slidably inserted through long holes 52 is formed respectively in the cover case members 15A, 15B and extends in the longitudinal direction. Further, in the rear end of the slider 57 which is opposite to the end supporting the pulley 50, the base end of the main lever 30, i.e., front end of the front section 31, is pivotally mounted on a bolt assortment 39 with a collar 44 externally fitted thereon, as a spindle, which is slidably inserted crosswise through long holes 51 formed respectively in the cover case members 15A, 15B and extending in the longitudinal direction.

A swinging end of a link 36 having two-piece structure is pivotally attached to the middle of the front section 31 of the main lever 30 by means of a rivet 38 with a collar 42 externally fitted thereon as a spindle. The base end of the link 36 is pivoted by a bolt assortment 29 with a collar 41 externally fitted thereon as a pivot pin. The bolt assortment 29 is inserted through the cover case 15A, 15B.

Thus, the main lever 30, the link 36, the slider 57 and the like constitute the toggle mechanism T. When the rear section 32 of the main lever 30 is operated by fingers of a hand which is gripping the grip 11 to pivotally move from the release position shown in FIG. 2 to the set position close to the grip 11 as shown by the solid line in FIG. 3, the rivet 38 as a joint between the main lever 30 and the link 36 is brought close to the straight line connecting the bolt assortments 39, 54 respectively inserted through the long holes 51, 52 and the bolt assortment 29 pivotally supporting the link 36, and in parallel therewith. The bolt assortments 39, 54 inserted through the long holes 51, 52 are caused to move from the rear ends to the front ends of the long holes 51, 52, respectively. Concurrently therewith, the pulley 50 is moved from the first position (see FIG. 2) where the throttle cable 20 is unoperated to the second position (shown by the solid line in FIG. 3) where the play is eliminated, when the sub-lever 60 is unoperated and positioned at the pivotal movement beginning end as shown in FIG. 2.

Figure 5:
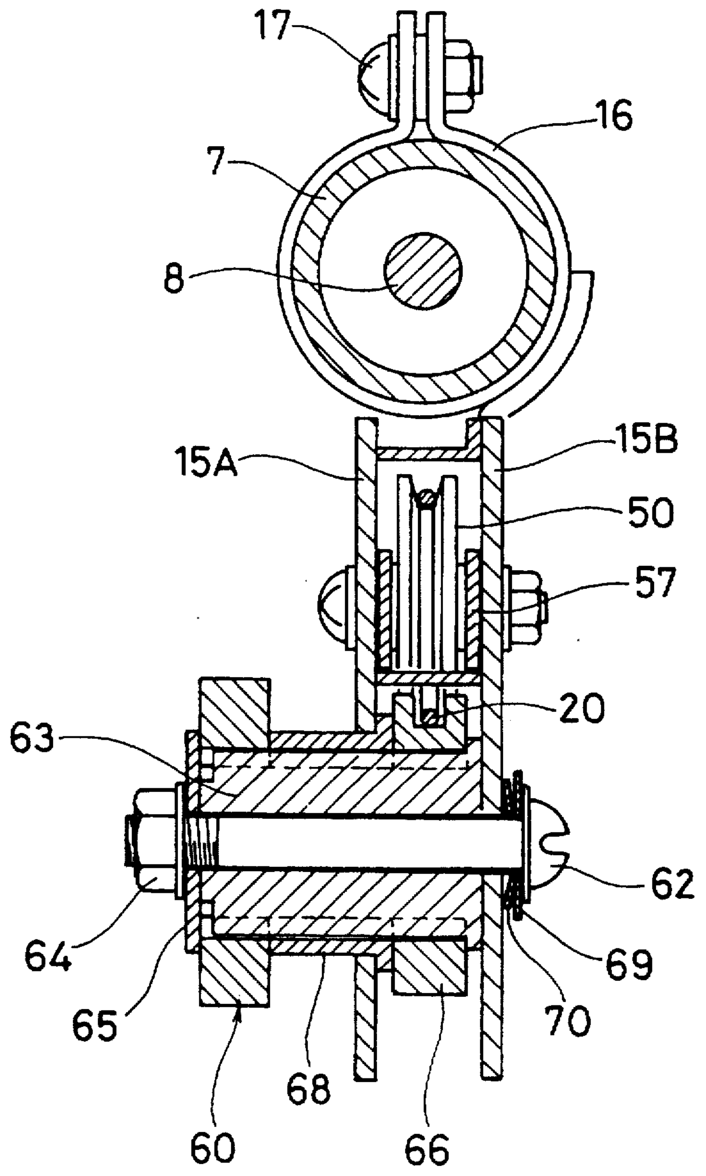
FIG. 5 is an enlarged sectional view taken along the line V—V and viewed in the direction of the arrows in FIG. 2.

As will be seen with reference to FIGS. 3 and 5, the sub-lever 60 is unified with the traction member 66, to which the terminal metal piece 22 of the throttle cable 20 is anchored, and a spacer collar 68 by serration-fitting them each on a serrated pin 63. A through bolt 62 is inserted into the serrated pin 63 through the cover case 15A, 15B. Between the head of the through bolt 62 and the right cover case member 15B, a washer 69 and a belleville spring 70 are interposed. On the threaded end of the through bolt 62, a nut 64 is screwed with a thrust plate 65 interposed between the nut 64 and the serrated pin 63. By tightening the nut 64, the serrated pin 63 is pressed against the inner surface of the right cover case member 15B via the thrust plate 65, sub-lever 60, spacer collar 68 and traction member 66. It is noted that by controlling the tightening force with the nut 64, the frictional force between the sub-lever 60 and the right cover case 15B is adjusted, and thus, the sub-lever 60 can be immobilized at a desired pivotal operation position.

Figure 2:
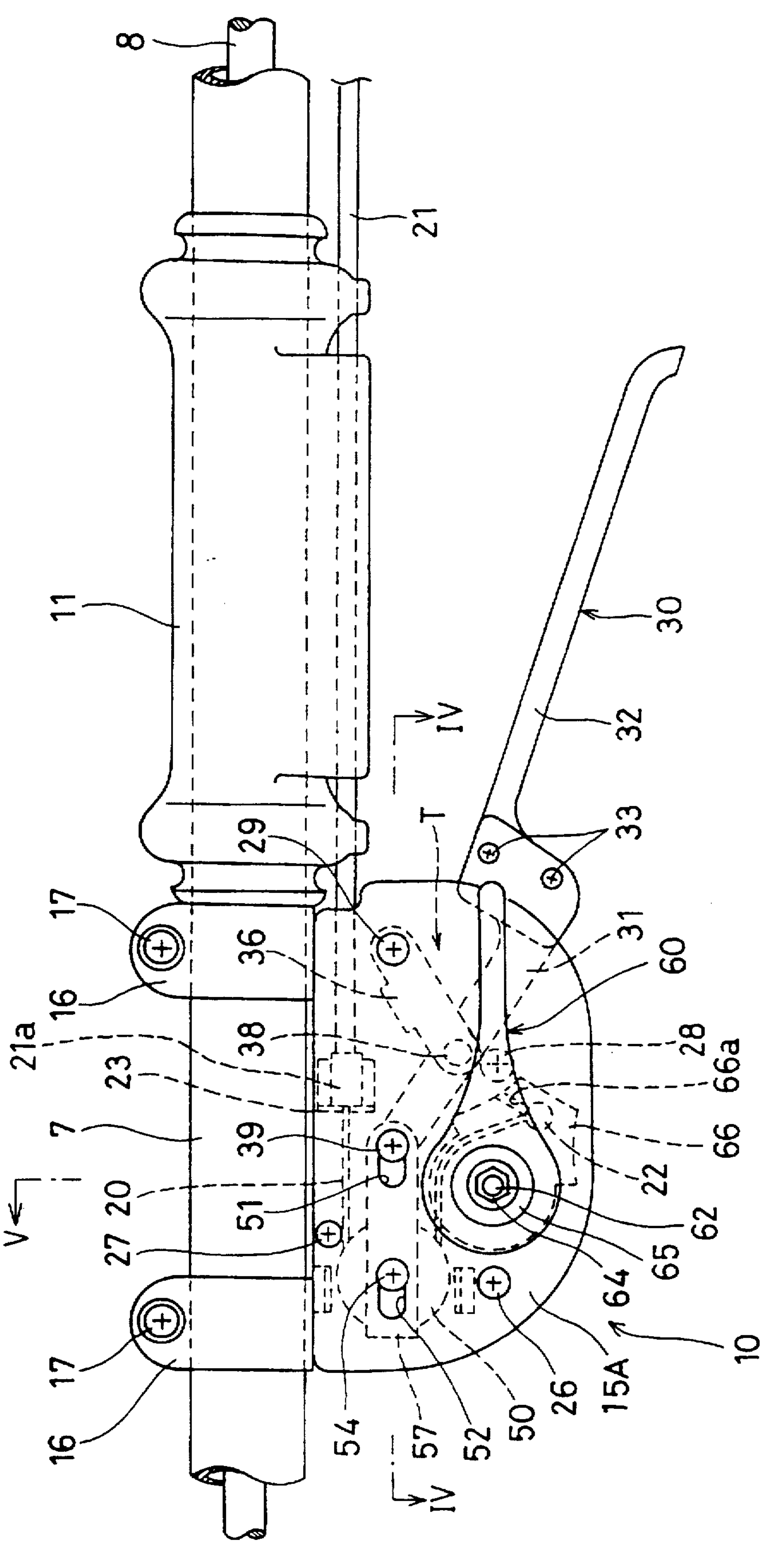
FIG. 2 is a side view showing the one embodiment of the hand lever device-according to the present invention.

In the hand lever device 10 of this embodiment constructed as described above, when the main lever 30 is operated to pivotally move from the release position shown in FIG. 2 to the set position close to the grip 11, the pulley 50, by way of which the throttle cable 20, is moved by the action of the toggle mechanism T. The toggle mechanism T uses the main lever 30 as a constituent link from the first position (see FIG. 2) where the throttle cable 20 is unoperated to the second position (shown by the solid line in FIG. 3) where the play is eliminated.

The throttle cable 20 is thereby drawn in a predetermined amount by the pulley 50 to eliminate the play. While holding the main lever 30 at the set position, the sub-lever 60 is operated by the fingers of the operator's hand which are gripping the grip 11 to pivotally move from the position shown in FIG. 2 to a position corresponding to a desired rotational speed of the internal combustion engine as shown in FIG. 3. The throttle cable 20 is thereby further drawn via the pulley 50 to rotate the throttle valve CV from the minimum degree of opening (for idle rotation) in the opening direction, thus adjusting the degree of opening of the throttle valve CV. The rotational speed of the engine 2 is controlled according to the adjusted degree of opening.

In this condition, even if the fingers are removed from the sub-lever 60, the sub-lever 60 is kept immobilized at the pivotal operation position by the frictional force with the cover case member 15B. Accordingly, the throttle valve CV is kept at the adjusted degree of opening (set degree of opening), thereby enabling, fatigue of the operator's fingers to be relieved.

In the event that it is necessary to immediately lower the rotational speed of the engine 2 due to occurrence of an accident or the like, the main lever 30 is released. The pulley 50 is thereby caused to return from the second position to the first position, and the throttle cable 20 is in turn returned to the non-operating position to return the throttle valve CV to the minimum degree of opening. Consequently, the engine 2 is brought into idle rotation. In the brush cutter 1 of this example, the rotational driving force of the engine 2 is transmitted to the operative portion 3 including the cutting blade 13 and the like via a centrifugal clutch (not shown). Accordingly, the centrifugal clutch is automatically disconnected to cut off the transmission of the driving force to the operative portions, thereby immediately stopping the operation of the operative portion 3 including the cutting blade 13.

When the main lever 30 is again operated to pivotally move to the set position close to the grip 11 after having been released, the play of the throttle cable 20 is eliminated with the sub-lever 60 still immobilized at the pivotal operation position previously set. Consequently, the throttle valve CV is returned to the degree of opening at which it had stood before the main lever 30 was released, without the necessity of readjusting the sub-lever 60.

Further, since the main lever 30 is used as a constituent link of the toggle mechanism T, when the main lever 30 brought to a position closer to the set position, a lesser force is required to hold it. Accordingly, even if the grip 11 is held for a long period of time with the main lever 30 at the set position, the operator's fingers do not become as tired.

In the above example, the hand lever device 10 according to the present invention is used to control degree of opening of the throttle valve CV of the internal combustion engine 2. It is, however, to be noted that the hand fever device according to the present invention may of course be used in applications other than adjusting degree of opening of a throttle valve, such as a safety brake device.

Further, besides the bar handle 7, the hand lever device 10 may be used by mounting it on a U-shaped handle and the like.

As understood from the above description, according to the hand lever device of the present invention, excellent benefits are attained. For example, the throttle valve as a driven member can be adjusted appropriately in its degree of opening via the cable and kept at a desired degree of opening and yet immediately returned to the minimum degree of opening to ensure high safety, fatigue of the operator's fingers is diminished, and the throttle valve is enabled to be brought to the degree of opening at which it had stood before it was returned to the minimum degree of opening without the necessity of readjustment.

What is claimed is:

1. An apparatus comprising:
- a hand lever device comprising:
  - a pivotally operated main lever; and
  - a pivotally operated sub-lever;
- a cable, said sub-lever of said hand lever device being adapted to draw said cable;
- a driven member, said driven member being connected to said cable; and
- a cable turnaround member, said cable turnaround member being moved by said main lever of said hand lever device;
- wherein the cable turnaround member is rotatably held by a slider of a toggle mechanism; and
- the main lever is used as a constituent link of the toggle mechanism.

2. The apparatus according to claim 1, wherein the cable turnaround member is a pulley.

3. The apparatus according to claim 1, wherein the driven member is a throttle valve of an internal combustion engine.

4. The apparatus according to claim 1, wherein the sub-lever is adapted to be immobilized at a desired position.

5. An apparatus comprising:
- a hand lever device comprising:
  - a main lever; and
  - a sub-lever;
- a working machine comprising:
  - a handle having a grip, said hand lever device being disposed in the vicinity of said grip;
  - an operative portion including
    - a cutting blade;
    - an internal combustion engine driving said cutting blade and provided with a throttle valve; and
    - said throttle valve being always biased in the direction of a degree of opening for idle rotation and thereby adapted so that when a throttle cable connected thereto is drawn from a non-operating position by a predetermined amount or more, play is eliminated and the throttle valve begins to open from the degree of opening for idle rotation; and
    - a cable turnaround member, wherein the throttle cable is drawn by the sub-lever via the cable turnaround member, and the cable turnaround member is moved by the main lever from a first position where the throttle cable is unoperated to a second position where the play is eliminated.

6. The apparatus according to claim 5, wherein the sub-lever is adapted to be held immobilized at a desired position.

* * * * *